Figure 1:
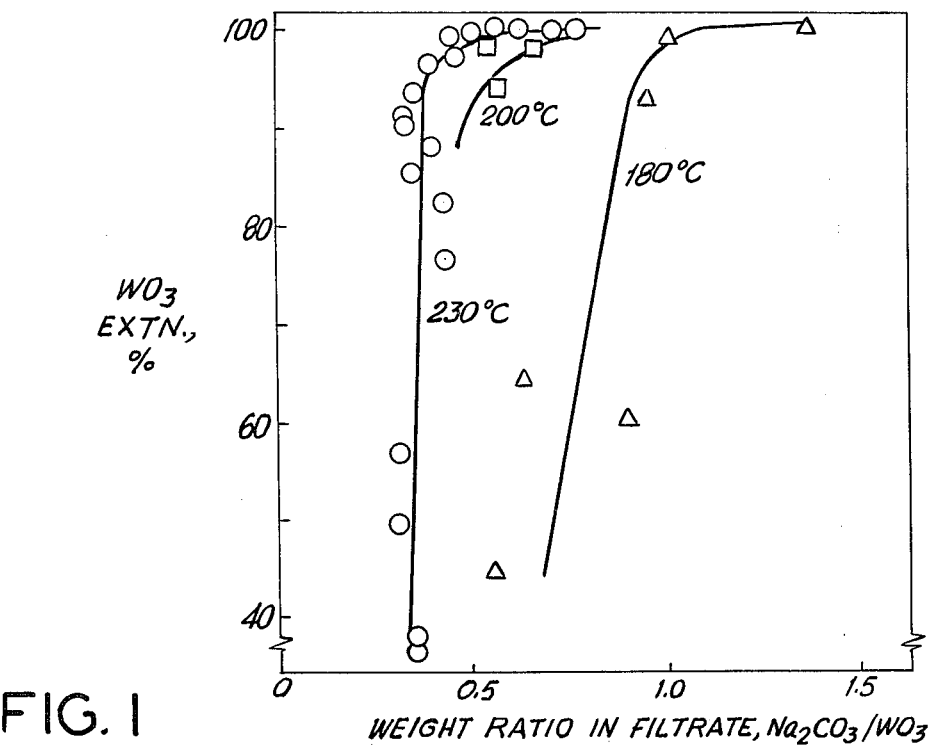

United States Patent [19]

Queneau et al.

[11] 4,325,919

[45] Apr. 20, 1982

[54] AUTOCLAVE SODA DIGESTION OF SCHEELITE CONCENTRATES WITH FEEDBACK CONTROL

[75] Inventors: Paul B. Queneau, Golden; Leo W. Beckstead, Arvada; Dale K. Huggins, Golden, all of Colo.

[73] Assignee: AMAX Inc., Greenwich, Conn.

[21] Appl. No.: 225,910

[22] Filed: Jan. 19, 1981

[51] Int. Cl.³ ............................................. C01G 41/00
[52] U.S. Cl. ........................................ 423/61; 423/53; 423/DIG. 5
[58] Field of Search ............... 423/53, 58, 61, DIG. 5; 75/101 R

[56] References Cited

U.S. PATENT DOCUMENTS

| | | | |
|---|---|---|---|
| 2,351,678 | 6/1944 | Hall | 423/58 |
| 2,927,871 | 3/1960 | Maniki et al. | |
| 3,429,693 | 2/1969 | Bauer et al. | 423/61 |
| 4,092,400 | 5/1978 | Zbranek et al. | 423/54 |
| 4,167,555 | 9/1979 | Gomes et al. | 423/61 |

OTHER PUBLICATIONS

Grigorin et al., "Chemical Absts.", vol. 61, 1964, #9209a.
Zelikman et al., "Chemical Absts.", vol. 89, 1978, #133099p.

Primary Examiner—Herbert T. Carter
Attorney, Agent, or Firm—Michael A. Ciomek; Eugene J. Kalil

[57] ABSTRACT

A continuous process with feedback control is disclosed for the soda ash digestion of tungsten concentrates in which a slurry of the concentrate in an aqueous sodium carbonate solution is digested in an autoclave at a temperature of at least about 180° C. to provide a pregnant solution of $WO_3$. High dissolution efficiency is maintained during digestion by continuously monitoring the pregnant solution which includes determining the specific gravity and the $Na_2CO_3$ concentration of the pregnant liquor from which feedback signals are produced which are used to control the amount of $Na_2CO_3$ and $H_2O$ fed to the slurry in accordance with the digestion conditions predetermined to provide the desired dissolution efficiency.

20 Claims, 3 Drawing Figures

AUTOCLAVE SODA DIGESTION OF SCHEELITE CONCENTRATES WITH FEEDBACK CONTROL

This invention relates to a process for extracting tungsten from tungsten concentrates, for example, scheelite concentrates, and, in particular, to the soda ash digestion of substantially low-grade tungsten concentrates.

This application is related to copending application U.S. Ser. No. 225,914, filed Jan. 19, 1981, and copending application Ser. No. 225,913, filed Jan. 19, 1981, the disclosures of which are incorporated herein by reference.

STATE OF THE ART

It is known to recover tungsten from its ores and especially from scheelite concentrates. Generally, the ore is concentrated by gravity and flotation methods and the concentrate thereafter treated to recover tungsten therefrom as a substantially pure compound, such as ammonium paratungstate. The process generally includes the digestion of the concentrate in an alkaline solution under superatmospheric temperatures and pressures to provide a pregnant sodium tungstate solution. The pregnant tungstate solution, after separation from the undigested solids, is treated with a water-soluble sulfide and then acidified to precipitate molybdenum trisulfide. The purified pregnant solution is then subjected to a liquid ion exchange treatment to load the tungstate ions on an amine, following which the tungstate values are stripped from the loaded amine with an ammonium solution to provide an ammonium tungstate solution. The ammonium paratungstate is crystallized from the ammonium tungstate solution as a substantially pure compound, a portion of the mother liquor is removed and treated separately.

A soda ash digestion method which is applicable to ores of low tungsten content, as well as rich ores and concentrates, is that disclosed in U.S. Pat. No. 2,351,678. The tungsten-containing material is finely ground and then subjected to dissolution in a solution of soda ash ($Na_2CO_3$). The dissolution of scheelite, for example, is carried out in the soda ash solution at an elevated temperature corresponding to a pressure of about 200 lbs/in$^2$ gauge or at about 380° F. to 390° F. (193° C.–199° C.) in a closed vessel, e.g., an autoclave. The pulp ratio employed in the autoclave may comprise 3 parts water to 1 part of flotation concentrate by weight and to the concentrate is added soda ash (sodium carbonate) generally in the amount of 2 parts or more to 1 part of $WO_3$ equivalent in the concentrate. The reaction results in a solution containing sodium tungsten ($Na_2WO_4$) and excess unreacted sodium carbonate, the time varying from about 2½ to 4 hours. Calcium carbonate forms as an insoluble precipitate.

The excess sodium carbonate is subsequently neutralized with acid and, according to this patent, the tungsten in solution converted to iron tungstate by the addition of ferrous sulfate.

One of the disadvantages of this method is the relatively high consumption of soda ash and the rather high acid demand which adds to the cost of the process. Moreover, leaching solutions with relatively high sodium carbonate alkalinity tend to cause dissolution of gangue minerals contained in the concentrate which should be avoided as much as possible.

Autoclave soda ash digestion of scheelite is well established commercially and is being used in several plants around the world to process off-grade scheelite concentrates. One plant has operated in California for some time in which scheelite concentrates of approximately 10% to 20% $WO_3$ have been treated using soda ash digestion. A similar soda ash digestion plant is operating in Austria. A disadvantage of such processes is the use of relatively large amounts of sodium carbonate at $Na_2CO_3/WO_3$ weight ratios of over 1.8:1 and even over 2:1, such ratios tending to favor dissolution of silica in the concentrate at elevated temperatures and pressures.

Recently, a particular low-grade refractory scheelite concentrate which has presented problems is a concentrate produced by the Canadian Tungsten Mining Corporation (CanTung concentrate). While certain of the concentrates are classified as "leachable" concentrates in that a dilute hydrochloride acid leach can produce a tungsten product containing 60% to 65% $WO_3$, others contain large amounts of silica minerals and proportionately smaller amounts of alkaline earth carbonates. Such concentrates appear to be unleachable in that dilute acid leaching improves the grade to only about 40% to 55% $WO_3$. These so-called "non-leachable" concentrates, while being capable of being digested in soda ash solutions, presented the problem of yield; that is to say, dissolution yields were not always as high as desired, i.e., in excess of 95% dissolution rate, such as in excess of 97%.

RELATED APPLICATION

In the related applications Ser. No. 225,914 and Ser. No. 225,913 referred to hereinbefore, a process is disclosed for the soda ash digestion of difficult-to-leach tungsten concentrates, such as refractory low-grade scheelite concentrates containing by weight about 2% to 40% $WO_3$, generally about 5% to 30% $WO_3$, e.g., about 10% to 20%, although concentrate containing about 2% to 70% $WO_3$ can similarly be treated.

In the aforementioned related application Ser. No. 225,914, a process is disclosed for the soda ash ($Na_2CO_3$) digestion of scheelite concentrates, particularly low-grade scheelite concentrates. The process is based on the recognition of a surprising interaction between soda ash concentration, the $Na_2CO_3/WO_3$ weight ratio, the aqueous tungsten concentration in the pregnant liquor, and the temperature employed in the digestion of scheelite concentrates in aqueous soda ash solution; and that by taking advantage of the interrelationships between the aforementioned four parameters, it has been possible (1) to reduce substantially the amount of soda ash required to attain the desired tungsten extraction, (2) to minimize the excess soda ash in the pregnant liquor, (3) to provide maximum extraction yield of the tungsten as $WO_3$, and (4) to provide maximum concentration of $WO_3$ in the pregnant liquor, while (5) inhibiting substantial dissolution of gangue minerals.

The process disclosed in the related application resides in forming a slurry of scheelite concentrate in an aqueous sodium carbonate solution of concentration ranging from about 50 gpl to 200 gpl at a $Na_2CO_3/WO_3$ weight ratio of about 0.9 to 1.6 and then digesting the slurry in an autoclave at a temperature ranging from about 180° C. to 310° C., e.g., about 200° C. to 250° C. or 270° C., preferably from about 200° C. to 235° C. The desired efficiency can be attained by employing the $Na_2CO_3$ concentration of the leach solution in substantially inverse relationship with the digestion temperature and in substantially direct relationship with the $Na_2CO_3/WO_3$ weight ratio, the relationship selected being such as to effect dissolution of at least about 95% of the $WO_3$ in the concentrate, preferably at least about 97% or 98%, and provide a pregnant liquor containing said $WO_3$. It has been observed that the higher the digestion temperature, the less is the amount of soda ash needed to achieve high tungsten extraction and the greater is the $WO_3/Na_2CO_3$ ratio in the pregnant liquor.

The extraction efficiency is sensitive to the conditions in the autoclave and can vary in accordance with the changes in the parameters during digestion; for example, the gradual change in the composition and the characteristics (e.g., leaching characteristics) of the concentrate fed to the autoclave may have a negative effect on the extraction efficiency of the digestion process. Such variations may be reflected in the ultimate composition of the pregnant liquor in terms of the $WO_3$ and the $Na_2CO_3$ contents, the $WO_3$ content being substantially related to the specific gravity of the pregnant liquor.

We have discovered that we can control and maintain a high level of extraction efficiency by monitoring the pregnant liquor during continuous digestion of the concentrate and by adjusting the amount of $Na_2CO_3$ and % solids fed to the autoclave in accordance with the information obtained during monitoring.

It is known to monitor the $Na_2CO_3$ concentration in the pulp during autoclave leaching of scheelite-powellite intermediate products using a method involving the determination of temperature-corrected electrical conductivity of the solution. The co-determination of electrical conductivity and ultrasound velocity is used to provide computerized monitoring of $Na_2CO_3$ and $WO_3$ concentrations. The foregoing technique is disclosed in a Russian paper under the title "Automatic Control of Solution Concentration During The Processing of Scheelite-Powellite Intermediate Products" by V. G. Shapovalov et al (USSR), Tsvetn. Met., 1978(5), 83–5.

The monitoring method of the invention is advantageous in that it is simpler to operate and is particularly applicable in controlling the $Na_2CO_3$ concentrations at levels conducive to inhibiting dissolution of silica in the concentrate.

OBJECTS OF THE INVENTION

It is an object of the invention to provide an improved process for the soda digestion of tungsten concentrates, for example, low-grade refractory concentrates normally difficult to digest.

Another object is to provide a continuous process for substantially completely digesting low-grade refractory tungsten concentrates in an autoclave at high extraction efficiencies and maintaining such efficiencies by employing an on-line feedback control process based on the composition of the pregnant liquor formed in the process.

These and other objects will more clearly appear when taken in conjunction with the following disclosure, the appended claims, and the accompanying drawings.

IN THE DRAWINGS

Figure 2:
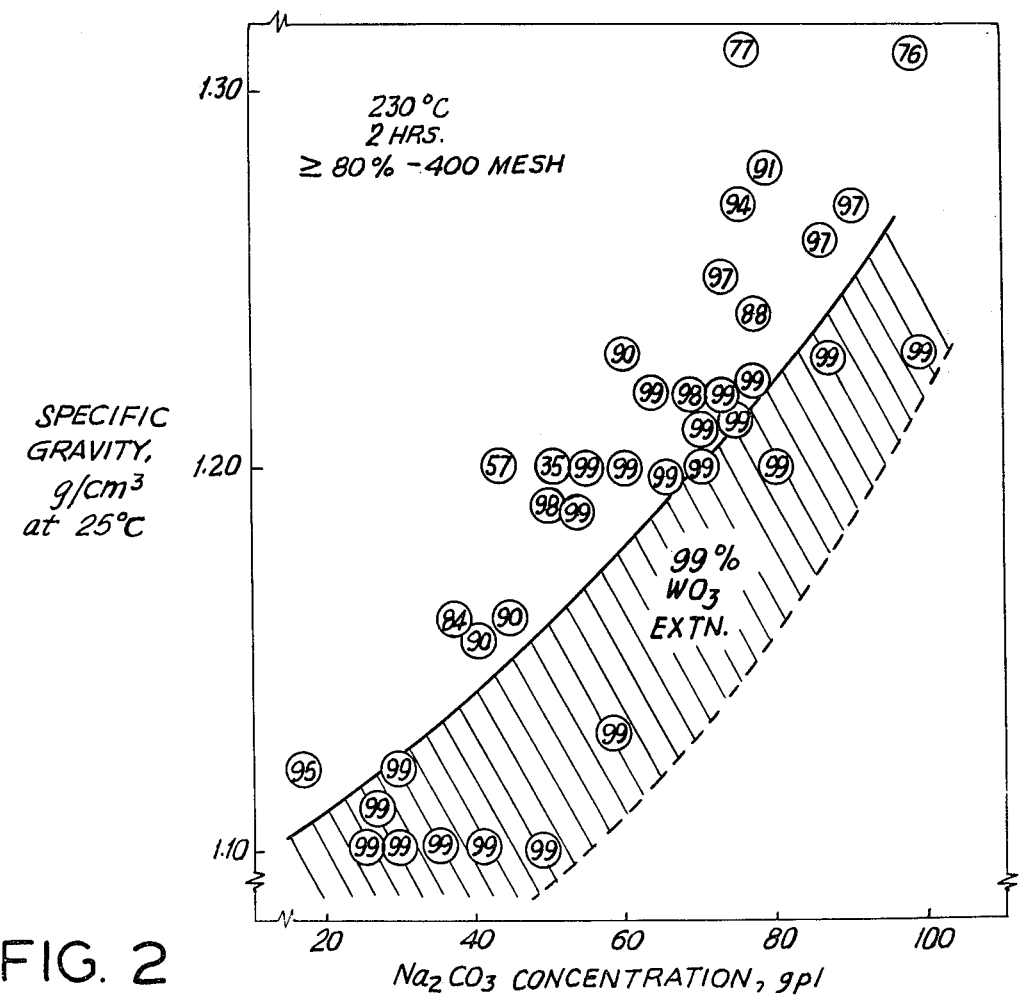
Figure 3:
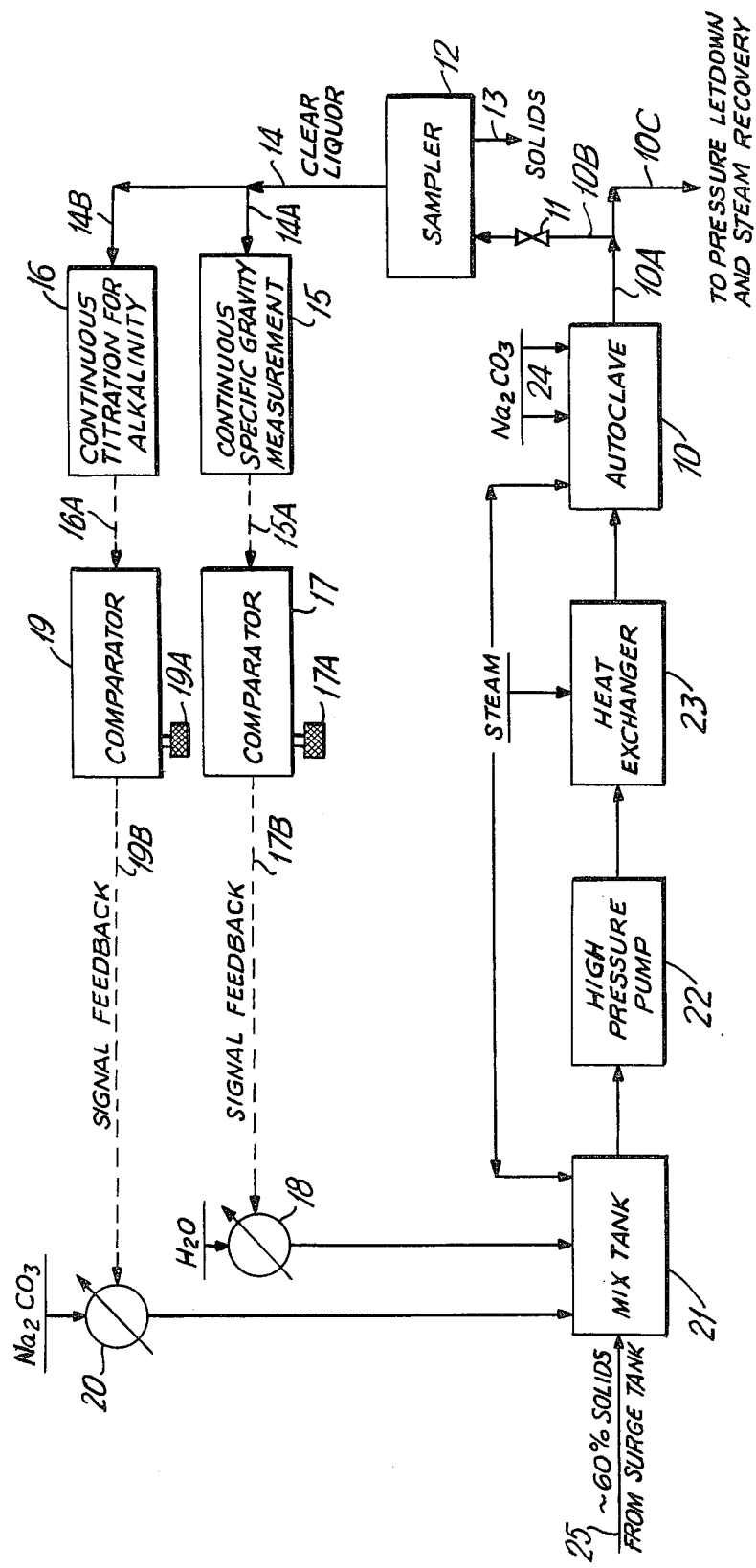

FIG. 1 depicts a series of curves showing the percent $WO_3$ extracted as a function of the $Na_2CO_3/WO_3$ weight ratio for three digestion temperatures, to wit: 180° C., 200° C., and 230° C.;

FIG. 2 is a broad band curve showing the relationship between the specific gravity of the pregnant liquor and the sodium carbonate concentration thereof for various percent extractions of $WO_3$ indicated in circles distributed in and about the broad band curve; and FIG. 3 is a block diagram showing schematically one embodiment of the process utilizing an on-line feedback control system for consistently assuring and maintaining high extraction efficiencies of $WO_3$ from low-grade tungsten concentrates, such as scheelite concentrates.

SUMMARY OF THE INVENTION

The invention resides in a continuous process for maintaining high $WO_3$ extraction efficiency in the soda ash digestion of tungsten concentrates in which a tungsten concentrate is slurried with an aqueous sodium carbonate solution and digested at a selected superatmospheric pressure and a temperature selected in the range of about 180° C. to 310° C. The superatmospheric pressure may range from about 145 psig to 1430 psig. The invention comprises as one embodiment, the steps of forming a slurry of a tungsten concentrate charge of selected average particle size in an aqueous sodium carbonate solution of concentration selected to fall in the range of about 50 gpl to 200 gpl at a $Na_2CO_3/WO_3$ weight ratio ranging from about 0.9 to 2, the concentration of the $Na_2CO_3$ solution being substantially inversely correlated to the selected digestion temperature and substantially directly correlated to the $Na_2CO_3/WO_3$ weight ratio, and digesting the tungsten concentrate in an autoclave at said selected pressure and temperature for a time selected to provide the desired high extraction efficiency of $WO_3$ equivalent from said tungsten concentrate and form a pregnant liquor thereof.

While the digestion is in progress, the pregnant liquor is continuously monitored by sampling which includes: (1) titrating the solution to determine its alkalinity and hence the sodium carbonate concentration; and (2) determining the specific gravity of the pregnant liquor which is directly related to the $WO_3$ concentration.

Each of the determined values is then compared to a predetermined reference value corresponding to the desired condition and a difference or feedback signal obtained which is then used to vary the amount of $Na_2CO_3$ to the mix tank which feeds the autoclave and also the amount of water to control the pulp density and ultimately the $WO_3$ concentration in the pregnant liquor. Depending on its sign, the difference signal may either increase or decrease the amount of $Na_2CO_3$ and water fed to the tank.

By employing the foregoing monitoring technique, the desired high extraction efficiency can be maintained while inhibiting dissolution of gangue mineral in the concentrate, such as gangue containing one or more of CaO, $SiO_2$, calcium fluoride, etc. While the final level of $SiO_2$ is related to the digestion conditions, it is also a function of gangue mineralization, for example, as to whether magnesium is present in the form of a compound. The presence of magnesium either naturally or as an additive (e.g., dolomite) has an inhibiting effect on the dissolution of $SiO_2$. The amount of magnesium present may range from about 2% to 10% by weight of the concentrate, e.g. about 4% to 6%.

It is preferred that the soda ash concentration range from about 75 gpl to 175 gpl and, more preferably, from about 75 gpl to 150 gpl. Likewise, the $Na_2CO_3/WO_3$ weight ratio may range from about 1 to 1.6, and generally from about 1.1 to 1.4, the temperature ranging from about 200° C. to 250° or 270° C., and preferably from about 200° C. to 235° C. The pressure in the autoclave may range from about 225 psig to 575 psig over the temperature range of about 200° C. to 250° C. or about 225 psig to 800 psig over the temperature range of about 200° C. to 270° C.

In order to obtain consistently high extraction efficiencies, e.g., at least about 97% or 98% and higher, we have found it important to control the following five parameters: temperature, time, particle size, soda ash concentration, and the final concentration of $WO_3$ in the pregnant liquor. We have also found that if the first three parameters (i.e., temperature, time, and particle size) are fixed during digestion, one can monitor digestion performance by determining if the pregnant liquor meets the requirements imposed by the last two parameters, that is, the residual $Na_2CO_3$ and the $WO_3$ concentration (specific gravity) in the liquor.

As a result of many runs made on low-grade tungsten concentrates, it has been possible to correlate the $WO_3$ content of the pregnant liquor and the residual $Na_2CO_3$ to the dissolution efficiency of the process. As the tungsten content of the pregnant liquor increases, the specific gravity of the solution increases, tungsten being one of the heavier elements in the Periodic Table. Thus, by relating specific gravity of the pregnant liquor (and thus the $WO_3$ content) to the residual $Na_2CO_3$ in the liquor, a very useful and simple correlation is obtained which can be employed in an on-line feedback control system for consistently maintaining the digestion conditions conducive to maintaining high extraction yields of $WO_3$. Thus, the correlation provides a basis of instrumentation for maintaining automatically the concentrate—$Na_2CO_3$—$H_2O$ feed mix during continuous autoclave soda ash leaching as gradual changes occur in the composition and/or characteristics of the feed concentrate.

A typical correlation is shown in FIG. 2 which is a broad band plot of a series of runs on low-grade tungsten concentrates. The specific gravity of the liquor is taken as a measure of $WO_3$ in the liquor. The data collected indicate that the correlation appears to hold for all the concentrates which have been tested.

The broad band curve or crescent shown in FIG. 2 shows many points (circles) within and outside the hash-marked area of the crescent (defined by boundary lines AB and CD), each circle having within it a number which depicts the extraction efficiency obtained for its particular specific gravity—$Na_2CO_3$ correlation. As will be noted, the points within the crescent all indicate an extraction efficiency of about 99%, with some of the 99% points also appearing to the left of boundary line AB.

The area within the crescent illustrates the preferred conditions for obtaining about 99% extraction efficiency and higher. However, the invention is not to be construed to be limited to controlling and maintaining such high levels, so long as the on-line feedback control consistently provides over 95% extraction efficiency with variations in feed concentrates.

Increasing the time and temperature of digestion can shift the "crescent" to the left. It has been found that grinding the feed to at least about 25% finer than 400 mesh not only shifts the crescent to the left but also widens it, thus enabling greater flexibility in the use of on-line feedback control. In this connection, grinding to a finer particle may be an important element in carrying out the invention.

Moreover, the on-line feedback control can be very important in minimizing double salt formation (i.e., $Na_2CO_3.xCaCO_3$) and thus inhibit scaling on the walls of the autoclave during digestion.

DETAILS OF THE INVENTION

As stated in the related applications, the invention is particularly applicable to the soda ash pressure digestion of difficult-to-leach low-grade scheelite referred to herein as CanTung concentrates contained by weight from about 2 to 40% $WO_3$, generally from about 5% to 30% $WO_3$, e.g., about 10% to 20% $WO_3$. The invention is also applicable to such concentrates containing at least about 2% silica.

The process applied to such CanTung concentrates has resulted in 99.7% solubilization of tungsten with a $Na_2CO_3$ concentration of 75 gpl at a relatively high temperature of 230° C. Soda ash consumption was 1.2 kg/kg $WO_3$ during the two-hour digestion.

The pressure digestion runs are conducted in a Parr two-liter titanium autoclave. A single 5.8 cm diameter, 6-bladed pitch-blade radial turbine impeller located 2.5 cm off the reactor bottom is used to agitate the slurry. Heat is provided by an electric heating mantle. A run is begun by adding a charge of the concentrate to the reactor along with enough sodium carbonate solution to give the desired percent solids. The slurry is agitated at 600 rpm as heat is applied to the system. Approximately one-half to three-quarters of an hour is required to reach the desired temperature. Timing of the test begins as soon as the temperature is reached. At the end of the run, the reactor is placed in a water bath, which cools the slurry to approximately 70° C. The slurry is filtered hot with the solids being repulped and filtered three times using distilled water. The weight of wash water used in each repulp step is approximately 1.0 to 1.2 times the weight of solid residue. Analysis of the washed leach residue enables calculation of tungsten extraction.

It is preferred that the feed concentrate before digestion be subjected to the removal of the flotation reagent as described in the copending related applications.

In carrying out the invention, the soda ash stoichiometry is calculated based on Reaction 1 as follows:

$$Na_2CO_3 + CaWO_4 = Na_2WO_4 + CaCO_3 \qquad (1)$$

The amount of reagent addition is referred to as either percent stoichiometric excess or as weight ratio of $Na_2CO_3/WO_3$ (kg/kg). The stoichiometric equivalent is 0.457 kg $Na_2CO_3$/kg $WO_3$.

EFFECT OF $Na_2WO_4$ CONCENTRATION

The concentration of $Na_2WO_4$ attained in the pregnant liquor during digestion is important in providing high dissolution yields. The primary digestion reaction (Reaction 1) set forth hereinabove involves both $Na_2CO_3$ and $Na_2WO_4$. Reaction 1 is reversible. By increasing the $Na_2CO_3$ to $Na_2WO_4$ weight ratio, extraction is increased. Conversely, decreasing this ratio or increasing the amount of $Na_2WO_4$ in the pregnant liquor can have a negative effect on the extraction efficiency.

Thus, to assure consistently high dissolution yields, the tungsten concentration contraints can be minimized by leaching to not exceeding about 100 gpl $WO_3$, e.g., about 75 to 95 gpl, and, more preferably, over the range of approximately 90 to 95 gpl $WO_3$. The temperature may preferably range from about 200° C. to 250° C. or 270° C. over pressures ranging from about 225 psig to 575 psig.

When the low-grade concentrate is digested, the pregnant liquor containing the sodium tungstate is further treated following filtration to remove such impurities as molybdenum. Any excess sodium carbonate is neutralized with acid and the PH adjusted to that value required to effect precipitation of Mo as $MoS_3$ using $H_2S$ as the precipitant. It is important that the $WO_3/Mo$ ratio in the purified solution be very high, for example, 20,000/1. To achieve this, the discharge pregnant solution should advantageously be at least about 100 gpl $WO_3$.

One method to achieve the foregoing requirements as described in the related applications is to leach to a final $WO_3$ concentration of less than 100 gpl, for example, to a range of about 75 to 95 gpl, more preferably, approximately 90 to 95 gpl, to obtain a high dissolution yield and then subject the discharge pregnant liquor to flash down to evaporate sufficient solution to increase the concentration of $WO_3$ in the pregnant liquor at least 10% and preferably at least about 15 or 20% or 25% of the original concentration and provide $WO_3$ concentrations ranging up to about 120 or 140 gpl. The foregoing desirable conditions can be controlled by the on-line feedback monitoring system of the invention.

In order to achieve 99+% extraction of $WO_3$ when using a reaction time of 2 hours, the initial $Na_2CO_3/WO_3$ ratio should be increased as the reaction temperature is decreased. Since increasing initial ratio increases the final $Na_2CO_3/WO_3$ ratio in the pregnant liquor, the use of a lower reaction temperature (i.e., in going from 230° C. to 180° C.) will result in a higher $Na_2CO_3/WO_3$ ratio in the pregnant liquor.

FIG. 1 shows the relationship between digestion temperature and the $Na_2CO_3/WO_3$ weight ratio in the pregnant liquor. To attain 99+% $WO_3$ solubilization at 180° C., a filtrate containing 120 gpl $WO_3$ must contain about 120 gpl free $Na_2CO_3$. The corresponding values for 200° C. and 230° C. are 90 and 60 gpl $Na_2CO_3$, respectively. Thus, at 230° C. much less residual $Na_2CO_3$ is required in the slurry to obtain essentially complete extraction of tungsten. Additionally, less gangue is dissolved, especially by controlling the rate at which $Na_2CO_3$ is added to the solution.

Using FIG. 1, one can calculate that digesting Can-Tung scheelite concentrate at 230° C. should result in one third less sodium sulfate waste than at 180° C. Moreover, gas evolution from the $MoS_3$ step may be cut by almost half when processing liquor generated at 230° C. vs 180° C. Thus, high temperature digestion (200° C. to 235° C. or 270° C.) is favored over temperatures less than 200° C.

THE ON-LINE FEEDBACK CONTROL

As has been stated herein, the concentrate feed may vary sufficiently to affect adversely the extraction efficiency. However, this can easily be compensated for, since it is possible to determine the $WO_3$ and $Na_2CO_3$ contents of the pregnant liquor so that the proper amount of $Na_2CO_3$ in the autoclave can be adjusted to assure high extraction efficiency.

Thus, referring to FIG. 3, the pregnant liquor 10A leaving autoclave 10 in a continuous process is split into sample stream 10B and discharge stream 10C which passes to pressure letdown and steam recovery as shown. The pregnant liquor 10C withdrawn is filtered, the molybdenum, if present, removed by precipitation as $MoS_3$ and the tungsten solution then sent to the ammonium paratungstate circuit for further treatment.

Sample stream 10B passes through valve 11 to sampler 12 where it is separated from solids 13 to provide a clear liquor 14 which is split into streams 14A and 14B which are passed, respectively, to specific gravity measurement station 15 and alkalinity measurement station 16.

A specific gravity signal is produced which represents the specific gravity 15A of the pregnant liquor which is fed to comparator 17 where it is compared to a predetermined reference value set by means 17A corresponding to the specific gravity desired in the pregnant liquor (i.e., the $WO_3$ concentration) to provide a difference signal feedback 17B which may be either negative or positive depending on the comparison, the difference signal being then fed to water control valve means 18 for continuously varying the flow of water (i.e., either increasing or decreasing it) to mix tank 21 so as to control the % solids within the tank, as the solids 25 are fed to the tank as shown.

Meanwhile, the alkalinity of the clear solution is measured by electrical titration at 16 to provide a signal 16A which is fed to comparator 19 where it is compared to a predetermined reference value set by means 19A to provide a difference signal feedback 19B which likewise may be negative or positive depending upon the comparison, which difference signal is then fed to control valve means 20 for continuously varying the feed of $Na_2CO_3$ to mix tank 21. As will be noted, less than the total amount of $Na_2CO_3$ is continuously fed to autoclave 10 at 24, with the remainder being continuously monitored by valve 20 as described hereinabove.

The materials in the mix tank are fed by high pressure pump 22 to heat exchanger 23 where the mix is heated to the desired temperature and then fed to autoclave 10 as shown.

In summary, the invention is directed to a continuous process for maintaining high $WO_3$ extraction in the soda ash digestion of tungsten concentrates, the process comprising, forming a slurry of a tungsten concentrate charge of selected average particle size in an aqueous sodium carbonate solution of concentration selected to fall in the range of about 50 gpl to 200 gpl at a $Na_2CO_3/WO_3$ weight ratio ranging from about 0.9 to 2, the concentration of the $Na_2CO_3$ solution being substantially inversely correlated to the selected digestion temperature and substantially directly correlated to the $Na_2CO_3/WO_3$ weight ratio. The tungsten concentrate is then digested in an autoclave at a selected temperature and pressure for a time selected to provide the desired high extraction efficiency of $WO_3$ equivalent from said tungsten concentrate and form a pregnant liquor thereof, and while the digestion is in progress the specific gravity and the $Na_2CO_3$ concentration of the pregnant liquor are each continuously determined.

Each value is then compared to a corresponding reference value predetermined to reflect the desired digestion conditions in the autoclave to provide a difference feedback signal, each of which is used to vary the amount of $Na_2CO_3$ and the amount of water, respectively, fed to the slurry in accordance with the compared difference values obtained in order to maintain the digestion in the autoclave at the desired high extraction efficiency.

In summary, the process of the invention is particularly applicable to tungsten concentrates containing the following percent ingredients by weight:

WO$_3$: about 2% to 40% (e.g., about 5% to 30%)
Mo: up to about 10%
F: up to about 10%
S: up to about 5%
CaO: about 1% to 30%
SiO$_2$: about 2% to 50%

The process is capable of treating such concentrates of average particle size passing through 150 mesh (U.S. Standard), for example, preferably at least about 25% minus 400 mesh, e.g., at least about 80% minus 400 mesh being particularly advantageous.

Although the present invention has been described in conjunction with preferred embodiments, it is to be understood that modifications and variations thereto may be resorted to without departing from the spirit and scope of the invention as those skilled in the art will readily understand. Such modifications and variations are considered to be within the purview and scope of the invention and the appended claims.

What is claimed is:

1. In a continuous process for maintaining high WO$_3$ extraction efficiency in the soda ash digestion of tungsten concentrates, wherein a tungsten concentrate is slurried with an aqueous sodium carbonate solution and digested at a temperature selected in the range of about 180° C. to 310° C. and a pressure ranging from about 145 psig to 1430 psig, the improvement which comprises:

forming a slurry of a tungsten concentrate charge of selected average particle size in an aqueous sodium carbonate solution of concentration selected to fall in the range of about 50 gpl to 200 gpl at a Na$_2$CO$_3$/WO$_3$ weight ratio ranging from about 0.9 to 2, the concentration of the Na$_2$CO$_3$ solution being substantially inversely correlated to the selected digestion temperature and substantially directly correlated to the Na$_2$CO$_3$/WO$_3$ weight ratio, digesting said tungsten concentrate in an autoclave at said selected temperature and pressure for a time selected to provide the desired high extraction efficiency of WO$_3$ equivalent from said tungsten concentrate and form a pregnant liquor thereof, and while said digestion is in progress determining the specific gravity value and the Na$_2$CO$_3$ concentration value of said pregnant liquor, comparing each of said values to a corresponding reference value predetermined to reflect the desired digestion conditions in said autoclave and provide a difference feedback signal, and then varying the amount of Na$_2$CO$_3$ and water fed to the slurry in accordance with the corresponding feedback signal obtained in order to maintain the digestion in the autoclave at a desired high extraction efficiency of over about 95%.

2. The process of claim 1, wherein the concentration of Na$_2$CO$_3$ ranges from about 75 to 175 gpl, the Na$_2$CO$_3$/WO$_3$ weight ratio from about 1 to 1.6 and the temperature from about 200° C. to 270° C.

3. The process of claim 1, wherein the concentration of Na$_2$CO$_3$ ranges from about 75 to 150 gpl, the Na$_2$CO$_3$/WO$_3$ weight ratio from about 1.1 to 1.4 and the temperature from about 200° C. to 250° C.

4. The process of claim 1, wherein the concentration of Na$_2$CO$_3$, the temperature and the Na$_2$CO$_3$/WO$_3$ weight ratio are correlated such as to control the WO$_3$ concentration in the pregnant solution following digestion to a level not exceeding about 100 gpl.

5. The process of claim 4, wherein the WO$_3$ concentration in the pregnant liquor following digestion is controlled to a level ranging from about 75 gpl to 95 gpl over a temperature range of about 200° C. to 270° C.

6. The process of claim 4, wherein following substantially complete digestion of the WO$_3$ in the concentrate, the pregnant liquor is flashed to the atmosphere to effect evaporation of the pregnant liquor sufficient to increase the WO$_3$ concentration in said liquor by at least about 10% of the pregnant liquor concentration prior to flash down.

7. The process of claim 6, wherein the level of WO$_3$ in the pregnant liquor is approximately 90 to 95 gpl and the liquor thereafter is flashed to increase the WO$_3$ concentration by at least about 15% of the original concentration.

8. The process of claim 1, wherein the average particle size of said concentrate is less than 150 mesh.

9. In a continuous process for maintaining high WO$_3$ extraction efficiency in the soda ash digestion of low-grade scheelite concentrates containing about 2% to 40% WO$_3$, wherein a scheelite concentrate is slurried with an aqueous sodium carbonate solution and digested at an elevated pressure and at a temperature selected in the range of about 180° C. to 310° C., the improvement which comprises:

forming a slurry of said concentrate of a selected average particle size in an aqueous sodium carbonate solution of concentration selected to fall in the range of about 50 gpl to 200 gpl at a Na$_2$CO$_3$/WO$_3$ weight ratio ranging from about 0.9 to 2, the concentration of the Na$_2$CO$_3$ solution being substantially inversely correlated to the selected digestion temperature and substantially directly correlated to the Na$_2$CO$_3$/WO$_3$ weight ratio, digesting said scheelite concentrate in an autoclave at said selected temperature and pressure for a time selected to provide the desired high extraction efficiency of WO$_3$ equivalent from said tungsten concentrate and form a pregnant liquor thereof, and while said digestion is in progress determining the specific gravity value and the Na$_2$CO$_3$ concentration value of said pregnant liquor, comparing each of said values to a corresponding reference value predetermined to reflect the desired digestion conditions for high WO$_3$ extraction efficiency in said autoclave and provide a difference feedback signal, and then varying the amount of Na$_2$CO$_3$ and water, respectively, fed to the slurry in accordance with the corresponding feedback signal obtained in order to maintain the digestion in the autoclave at a desired high extraction efficiency over at least about 97%.

10. The process of claim 9, wherein the concentration of Na$_2$CO$_3$ ranges from about 75 to 175 gpl, the Na$_2$CO$_3$/WO$_3$ weight ratio from about 1 to 1.6 and the temperature from about 200° C. to 270° C.

11. The process of claim 9, wherein the concentration of Na$_2$CO$_3$ ranges from about 75 to 150 gpl, the Na$_2$CO$_3$/WO$_3$ weight ratio from about 1.1 to 1.4 and the temperature from about 200° C. to 250° C.

12. The process of claim 9, wherein the concentration of Na$_2$CO$_3$, the temperature and the Na$_2$CO$_3$/WO$_3$ weight ratio are correlated such as to control the WO$_3$ concentration in the pregnant solution following digestion to a level not exceeding about 100 gpl.

13. The process of claim 12, wherein the $WO_3$ concentration in the pregnant liquor following digestion is controlled to a level ranging from about 75 gpl to 95 gpl over a temperature range of about 200° C. to 270° C. and a pressure of about 225 psig to 800 psig.

14. The process of claim 12, wherein following substantially complete digestion of the $WO_3$ in the low-grade concentrate, the pregnant liquor is flashed to the atmosphere to effect evaporation of the pregnant liquor sufficient to increase the $WO_3$ concentration in said liquor by at least about 10% of the pregnant liquor concentration prior to flash down.

15. The process of claim 14, wherein the level of $WO_3$ in the pregnant liquor is approximately 90 to 95 gpl and the liquor thereafter flashed to increase the $WO_3$ concentration by at least about 15% of the original concentration.

16. In a continuous process for maintaining high $WO_3$ extraction efficiency in the soda ash digestion of low-grade scheelite concentrates containing about 2% to 40% $WO_3$ and at least about 2% silica, wherein a scheelite concentrate is slurried with an aqueous sodium carbonate solution and digested at a selected superatmospheric pressure of about 225 psig to 800 psig and a temperature selected in the range of about 200° C. to 270° C., the improvement which comprises:

forming a slurry of said scheelite concentrate of a selected average particle size in an aqueous sodium carbonate solution of concentration selected to fall in the range of about 75 gpl to 175 gpl at a $Na_2CO_3/WO_3$ weight ratio ranging from about 1 to 1.6, digesting said scheelite concentrate in an autoclave in the presence of about 2% to 10% by weight of magnesium in the form of a magnesium containing compound at said selected pressure and temperature for a time selected to provide the desired high extraction efficiency of $WO_3$ equivalent from said tungsten concentrate and provide a pregnant liquor containing said $WO_3$ at a concentration level not exceeding about 100 gpl while inhibiting dissolution of gangue minerals, and while said digestion is in progress for said selected time period determining the specific gravity value and the $Na_2CO_3$ concentration value of said pregnant liquor, and comparing each of said values to a corresponding reference value predetermined to reflect the desired digestion conditions for high $WO_3$ extraction efficiency in said autoclave and provide a difference feedback signal, varying the amount of $Na_2CO_3$ and water, respectively, fed to the autoclave in accordance with the corresponding feedback signal value obtained in order to maintain the digestion in the autoclave at a desired high extraction efficiency of over about 95% and inhibit silica dissolution to below 1000 ppm, and then flashing said pregnant liquor to the atmosphere to effect evaporation of the pregnant liquor sufficient to increase the $WO_3$ concentration in said liquor by at least about 10% of the pregnant liquor prior to flash down.

17. The process of claim 16, wherein the concentration of $Na_2CO_3$ ranges from about 75 to 150 gpl, the $Na_2CO_3/WO_3$ weight ratio from about 1.1 to 1.4 and the temperature from about 200° C. to 250° C.

18. The process of claim 16, wherein the $WO_3$ concentration in the pregnant liquor following digestion is controlled to a level ranging from about 75 gpl to 95 gpl.

19. The process of claim 18, wherein the level of $WO_3$ in the pregnant liquor is approximately 90 to 95 gpl and the flash down of said liquor is such as to increase the $WO_3$ concentration by at least about 15% of the original concentration.

20. The process of claim 16, wherein the average particle size of said concentrate is less than 150 mesh.

* * * * *